(12) United States Patent
Xue et al.

(10) Patent No.: US 9,178,901 B2
(45) Date of Patent: Nov. 3, 2015

(54) MALICIOUS UNIFORM RESOURCE LOCATOR DETECTION

(71) Applicant: Microsoft Corporation, Redmond, WA (US)

(72) Inventors: Feng Xue, Beijing (CN); Bin Benjamin Zhu, Edina, MN (US); Weibo Chu, Xi'an (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 63 days.

(21) Appl. No.: 13/850,535

(22) Filed: Mar. 26, 2013

(65) Prior Publication Data

US 2014/0298460 A1     Oct. 2, 2014

(51) Int. Cl.
    *G06F 21/00*      (2013.01)
    *H04L 29/06*      (2006.01)
(52) U.S. Cl.
    CPC .................. *H04L 63/1425* (2013.01)
(58) Field of Classification Search
    CPC ............ H04L 63/1425; H04L 63/0236; G06F 21/128
    See application file for complete search history.

(56) References Cited

U.S. PATENT DOCUMENTS

| | | | |
|---|---|---|---|
| 7,774,459 B2 | 8/2010 | Wang et al. | |
| 8,079,087 B1* | 12/2011 | Spies et al. | 726/26 |
| 2007/0130327 A1* | 6/2007 | Kuo et al. | 709/224 |
| 2008/0289047 A1 | 11/2008 | Benea et al. | |
| 2008/0301116 A1 | 12/2008 | Wang et al. | |
| 2009/0094175 A1 | 4/2009 | Provos et al. | |
| 2010/0077481 A1 | 3/2010 | Polyakov et al. | |
| 2010/0153316 A1 | 6/2010 | Duffield et al. | |
| 2010/0313266 A1* | 12/2010 | Feng et al. | 726/23 |
| 2012/0158626 A1 | 6/2012 | Zhu et al. | |
| 2014/0007238 A1* | 1/2014 | Magee et al. | 726/24 |

FOREIGN PATENT DOCUMENTS

WO     WO2013009713 A2     1/2013

OTHER PUBLICATIONS

"Anti-Phishing Working Group", http://www.antiphishing.org/, Retrieved Date: Feb. 12, 2013, 2 pages.
Aggarwal et al., "PhishAri: Automatic Realtime Phishing Detection on Twitter", In Seventh IEEE APWG eCrime Researchers Summit, Oct. 23, 2012, 12 pages.

(Continued)

*Primary Examiner* — Chau Le
*Assistant Examiner* — Muhammad Chaudhry
(74) *Attorney, Agent, or Firm* — Julie Kane Akhter; Danielle Johnston Holmes; Micky Minhas

(57) ABSTRACT

The techniques described herein use training data to train classification models to detect malicious Uniform Resource Locators (URLs) that target authentic resources (e.g., Web page, Web site, or other network locations accessed via a URL). The techniques train the classification models using one or more machine learning algorithms. The training data may include known benign URLs and known malicious URLs (e.g., training URLs) that are associated with a target authentic resource. The techniques then use the trained classification models to determine whether an unknown URL is a malicious URL. The malicious URL determination may be based on one or more lexical features (e.g., brand name edit distances for a domain and path of the URL) and/or site/page features (e.g., a domain age and a domain confidence level) extracted.

20 Claims, 5 Drawing Sheets

(56) References Cited

OTHER PUBLICATIONS

Sheng et al., "An Empirical Analysis of Phishing Blacklists", In Proceeding of Sixth Conference on Email and Anti-Spam, Published Date: Jul. 16, 2009, 10 pages.
Chen et al., "Fighting Phishing with Discriminative Keypoints Features", In Journal of IEEE Internet Computing, vol. 13, No. 3, Published Date: May 2009, 8 pages.
Choi et al., "Detecting Malicious Web Links and Identifying Their Attack Types", In Proceedings of the 2nd USENIX Conference on Web Application Development, Published Date: Jun. 15, 2011, 12 pages.
Chou et al., "Client-side Defense Against Web-Based Identify Theft", In Proceedings of the 11th Annual Network and Distributed System Security Symposium, Published Date: Feb. 5, 2004, 16 pages.
Eshete et al., "BINSPECT: Holistic Analysis and Detection of Malicious Web Pages", In 8th International Conference on Security and Privacy in Communication Networks, Published Date: Sep. 3, 2012, 18 pages.
Fette et al., "Learning to Detect Phishing Emails", In Proceedings of the 16th International Conference on World Wide Web, Published Date: May 8, 2007, 8 pages.
Fu et al., "Detecting Phishing Web Pages with Visual Similarity Assessment Based on Earth Mover's Distance (EMD)", In Journal of IEEE Transactions on Dependable and Secure Computing, vol. 3, No. 4, Published Date: Oct. 2006, 11 pages.
Gyongyi et al., "Web Spam Taxonomy", In 1st International Workshop on Adversarial Information Retrieval on the Web, Published Date: May 2005, 9 pages.
Huang et al., "A SVM-based Technique to Detect Phishing URLs ", In Journal of Information Technology, Published Date: Jul. 2012, 5 pages.
Liu et al., "An Antiphishing Strategy Based on Visual Similarity Assessment", In Journal of IEEE Internet Computing, vol. 10, Issue 2, Published Date: Mar. 2006, 8 pages.
Ma et al., "Identifying Suspicious URLs: An Application of Large-Scale Online Learning", In Proceedings of the 26th International Conference on Machine Learning, Published Date: Jun. 14, 2009, 8 pages.
McGrath et al., "Behind Phishing: An Examination of Phisher Modi Operandi", In Proceedings of the 1st Usenix Workshop on Large-Scale Exploits and Emergent Threats, Published Date: Apr. 15, 2008, 8 pages.
Moore et al., "Examining the Impact of Website Take-Down on Phishing", In Proceedings of the Anti-Phishing Working Groups 2nd Annual eCrime Researchers Summit, Published Date: Oct. 4, 2007, 13 pages.
Ntoulas et al., "Detecting Spam Web Pages through Content Analysis", In Proceedings of the 15th International Conference on World Wide Web, Published Date: May 23, 2006, 10 pages.
Office action for U.S. Appl. No. 12/969,209, mailed on Dec. 10, 2012, Zhu et al., "Detection and Categorization of Malicious URLs", 9 pages.
"Phishing Activity Trends Report", obtained from http://docs.apwg.org/reports/apwg_report_Q4_2009.pdf, Oct.-Dec. 2009, 11 pages.
Ramachandran et al., "Understanding the Network-Level Behaviors of Spammers", In Proceedings of the Conference on Applications, Technologies, Architectures, and Protocols for Computer Communications, Published Date: Sep. 11, 2006, 12 pages.
Ronda et al., "Itrustpage: A User-Assisted Anti-Phishing Tool", In Proceedings of the 3rd ACM SIGOPS/EuroSys European Conference on Computer Systems, Published Date: Apr. 1, 2008, 12 pages.
Ross et al., "Stronger Password Authentication Using Browser Extensions", In Proceedings of the 14th conference on USENIX Security Symposium, vol. 14, Published Date: Jul. 31, 2005, 15 pages.
Whittaker et al., "Large-Scale Automatic Classi?cation of Phishing Pages", In Proceedings of the 17th Annual Network and Distributed System Security Symposium, Published Date: Feb. 28, 2010, 14 pages.
Zhang et al., "A Prior-based Transfer Learning Method for the Phishing Detection", In Journal of Networks, vol. 7, Issue 8, Published Date: Aug. 2012, 7 pages.
Zhang et al., "CANTINA: A Content-Based Approach to Detecting Phishing Web Sites", In Proceedings of the 16th International Conference on World Wide Web, Published Date: May 8, 2007, 10 pages.
Aha, "Lazy Learning", retrieved on Aug. 26, 2010 at <<http://www.kamuzonde.com/readings/prediction/aha_airev97.pdf>>, Kluwer Academic Publishers, Artificial Intelligence Review, vol. 11, 1997, pp. 7-10.
"APIs for GeoIP Products", retrieved on Aug. 26, 2010 at <<http://www.maxmind.com/app/api>>, MaxMind Inc., 2010, p. 1.
"Cisco IronPort Web Reputation Technology: Protecting Against URL Based Threats", retrieved on Aug. 30, 2010 at <<http://www.ironport.com/technology/ironport_web_reputation.html>>, Cicso Systems, 2010, pp. 1-3.
Cortes, et al., "Support Vector Networks", retrieved on Aug. 26, 2010 at <<http://citeseerx.ist.psu.edu/viewdoc/download?doi=10.1.1.15.9362&rep=rep1&type=pdf>>, Kluwer Academic Publishers, Machine Learning, vol. 20, No. 3, Sep. 1995, pp. 273-297.
Cova, et al., "Detection and Analysis of Drive-by-Download Attacks and Malicious JavaScript Code", retrieved on Aug. 26, 2010 at <<http://www.cs.ucsb.edu/~vigna/publications/2010_cova_kruegel_vigna_Wepawet.pdf>>, ACM, Proceedings of International Conference on World Wide Web (WWW), Raleigh, North Carolina, Apr. 2010, pp. 281-290.
Garera, et al., "A Framework for Detection and Measurement of Phishing Attacks", retrieved on Aug. 26, 2010 at <<http://citeseerx.ist.psu.edu/viewdoc/download?doi=10.1.1.142.4092&rep=rep1&type=pdf>>, ACM, Proceedings of Workshop on Recurring Malcode (WORM), Alexandria, Virginia, Nov. 2007, pp. 1-8.
Glosser, "DNS-BH—Malware Domain Blocklist: Malware Prevention through Domain Blocking (Black Hole DNS Sinkhole)", retrieved on Aug. 26, 2010 at <<http://www.malwaredomains.com>>, DNS-BH—Malware Domain Blocklist, 2010, pp. 1-19.
Guan, et al., "Anomaly Based Malicious URL Detection in Instant Messaging", retrieved on Aug. 26, 2010 at <<http://jwis2009.nsysu.edu.tw/location/paper/Anomaly%20Based%20Malicious%20URL%20Detection%20in%20Instant%20Messaging.pdf>>, Joint Workshop on Information Security (JWIS), 2009, pp. 1-14.
Holz, et al., "Detection and Mitigation of Fast-Flux Service Networks", retrieved on Aug. 26, 2010 at <<http://content.imamu.edu.sa/Scholars/it/net/16_measuring_and_detecting_slide.pdf>>, Proceedings of Network and Distributed System Security Symposium (NDSS), 2008, pp. 1-42.
Joachims, "Making Large-Scale SVM Learning Practical", retrieved on Aug. 26, 2010 at <<https://eldorado.tu-dortmund.de/dspace/bitstream/2003/2596/1/report24.pdf>>, Universtiy of Dortmund, LS-8 Report 24, Jun. 1998, pp. 1-17.
"jwSpamSpy: E-mail spam filter for Microsoft Windows", retrieved on Aug. 26, 2010 at <<http://www.jwspamspy.net>>, joewein.de LLC, 2004-2007, pp. 1.
L'Huillier, et al., "Online Phishing Classification Using Adversarial Data Mining and Signaling Games", retrieved on Aug. 26, 2010 at <<http://www.sigkdd.org/explorations/issues/11-2-2009-12/v11-2-18-CSI-LHuillier.pdf>>, ACM, SIGKDD Explorations, vol. 11, No. 2, 2009, pp. 92-99.
Lee, et al., "Uncovering Social Spammers: Social Honeypots + Machine Learning", retrieved on Aug. 26, 2010 at <<http://students.cse.tamu.edu/kyumin/papers/lee10sigir.pdf>>, ACM, Proceeding of International Conference on Research and Development in Information Retrieval, Geneva, Switzerland, Jul. 2010, pp. 435-442.
Ma, et al., "Beyond Blacklists: Learning to Detect Malicious Web Sites from Suspicious URLs", retrieved on Aug. 26, 2010 at <<http://citeseerx.ist.psu.edu/viewdoc/download?doi=10.1.1.153.3276&rep=rep1&type=pdf>>, ACM, Proceedings of International Conference on Knowledge Discovery and Data Mining (KDD), Paris, France, 2009, pp. 1245-1254.
"McAfee SiteAdvisor software", retrieved on Aug. 26, 2010 at <<http://www.siteadvisor.com/>>, McAfee, Inc, 2003-2010, p. 1.
Moore, et al., "Temporal Correlations between Spam and Phishing Websites", retrieved on Aug. 26, 2010 at <<http://www.usenix.org/event/leet09/tech/full_papers/moore/moore.pdf>>, USENIX Asso-

(56) References Cited

OTHER PUBLICATIONS ciation, Workshop on Large-Scale Exploits and Emergent Threats (LEET), Boston, MA, Apr. 2009, pp. 1-8.

Moshchuk, et al., "SpyProxy: Execution-based Detection of MaliciousWeb Content", retrieved on Aug. 26, 2010 at <<http://www.anti-keylogger.org/articles/spyproxy.pdf>>, USENIX Association, Proceedings of Security Symposium, Boston, MA, Article 3, 2007, pp. 1-16.

"Paysite Cash Becomes a Partner of WOT (Web Of Trust)", retrieved on Aug. 26, 2010 at <<http://www.mywot.com/>>, WOT Services, 2010, pp. 1.

"PhishTank: Join the fight against phishing", retrieved on Aug. 26, 2010 at <<http://www.phishtank.com/>>, OpenDNS, 2010, pp. 1-2.

Prakash, et al., "PhishNet: Predictive Blacklisting to Detect Phishing Attacks", retrieved on Aug. 26, 2010 at <<http://citeseerx.ist.psu.edu/viewdoc/download?doi=10.1.1.156.970&rep=rep1&type=pdf>>, IEEE Proceedings of Conference on Information Communications, San Diego, California, 2010, pp. 346-350.

Provos, et al., "All Your iFrames Point to Us", retreived on Aug. 26, 2010 at <<http://mmnet.iis.sinica.edu.tw/botnet/file/20100524/20100524_2_p.pdf>>, USENIX Association, Proceedings of Security Symposium, Aug. 2008, pp. 1-42.

Quinlan, "C4.5: Programs for Machine Learning", Morgan Kaufmann Publishers, San Francisco, CA., 1993, pp. 1-345.

Seifert, et al., "Identification of Malicious Web Pages with Static Heuristics", retrieved on Aug. 26, 2010 at <<http://citeseerx.ist.psu.edu/viewdoc/download?doi=10.1.1.139.8392&rep=rep1&type=pdf>>, Australasian Telecommunication Networks and Applications Conference (ATNAC), Adelaid, SA, Dec. 2008, pp. 91-96.

"Trend Micro Online URL Query—Feedback System", retrieved on Aug. 26, 2010 at <<http://reclassify.wrs.trendmicro.com/>>, Trend Micro, Inc., 1989-2010, pp. 1.

Tsoumakas, et al., "Mining Multi-label Data", retrieved on Aug. 26, 2010 at <<http://lkm.fri.uni-lj.si/xaigor/slo/pedagosko/dr-ui/tsoumakas09-dmkdh.pdf>>, Springer Berlin, Data Mining and Knowledge Discovery Handbook, 2010, pp. 1-20.

Tsoumakas, et al., "Random k-Labelsets for Multi-Label Classification", retrieved on Aug. 26, 2010 at <<http://lpis.csd.auth.gr/publications/tsoumakas-tkde10.pdf>>, IEEE Transactions on Knowledge and Data Engineering, 2010, pp. 1-12.

Wang, et al., "Automated Web Patrol with Strider HoneyMonkeys: Finding Web Sites That Exploit Browser Vulnerabilities", retrieved on Aug. 26, 2010 at <<http://citeseerx.ist.psu.edu/viewdoc/download?doi=10.1.1.63.812&rep=rep1&type=pdf>>, Internet Society, Proceedings of Network and Distributed System Security Symposium (NDSS), San Diego, California, Feb. 2006, pp. 1-15.

Wang, et al., "Spam Double-Funnel: Connecting Web Spammers with Advertisers", retrieved on Aug. 26, 2010 at <<http://citeseerx.ist.psu.edu/viewdoc/download?doi=10.1.1.78.810&rep=rep1&type=pdf>>, ACM, Proceedings of International Conference on World Wide Web (WWW), Banff, Canada, May 2007, pp. 291-300.

"Websense: ThreatSeeker Network: Foundation of the Websense Technology", retrieved on Aug. 26, 2010 at <<http://www.websense.com/content/ThreatSeeker.aspx>>, Websense, Inc., 2010, pp. 1.

Xiang, et al., "A Hybrid Phish Detection Approach by Identity Discovery and Keywords Retrieval", retrieved on Aug. 26, 2010 at <<http://nslap.kaist.ac.kr/courses/2009/cs712/paperlist/3-10.pdf>>, ACM, Proceedings of International Conference on World Wide Web (WWW), Madrid, Spain, Apr. 2009, pp. 571-580.

Yang, "An Evaluation of Statistical Approaches to Text Categorization", retrieved on Aug. 26, 2010 at <<http://citeseerx.ist.psu.edu/viewdoc/download?doi=10.1.1.109.2516&rep=rep1&type=pdf>>, Kluwer Academic Publishers, Information Retrieval, vol. 1, 1999, pp. 69-90.

Zhang, et al., "A k-Nearest Neighbor Based Algorithm for Multi-label Classification", retrieved on Aug. 26, 2010 at <<http://citeseerx.ist.psu.edu/viewdoc/download?doi=10.1.1.86.9501&rep=rep1&type=pdf>>, IEEE Proceedings of International Conference on Granular Computing, vol. 2, 2005, pp. 718-721.

Zhang, et al., "Highly Predictive Blacklists", retrieved on Aug. 26, 2010 at <<http://mtc.sri.com/pdfs/HighlyPredictiveBlacklists-SRI-TR-Format.pdf>>, SRI International, Apr. 12, 2007, pp. 1-42.

Zhang, et al., "ML-KNN: A Lazy Learning Approach to Multi-Label Learning", retrieved on Aug. 26, 2010 at <<http://citeseerx.ist.psu.edu/viewdoc/download?doi=10.1.1.89.7148&rep=rep1&type=pdf>>, Elsevier Science Inc. New York, Pattern Recognition, vol. 40, No. 7, Jul. 2007, pp. 2038-2048.

Miller, "Netcraft Phishing Feed to Protect Microsoft Customers", retrieved on May 25, 2008, available at <<http://news.netcraft.com/archives/2007/02/06/netcraft_phishing_feed_to_protect_microsoft_customers.html>>, 1 page.

Netcraft, "Fraud Detection Protect Your Brand Online", retrieved on May 25, 2008, available at <<http://www.netcraft.com/anti-phishing/fraud-detection/>>, 2 pages.

\* cited by examiner

MALICIOUS UNIFORM RESOURCE LOCATOR DETECTION

BACKGROUND

Due to the increased popularity and use of the World Wide Web, web users and their computing systems have become more exposed to cyber attacks and security threats. Malicious Uniform Resource Locators (URLs) are widely used in the computing industry to perform cyber attacks on web users and their computing systems. For example, malicious URLs may be accessed by users that are subjected to phishing attacks, spamming attacks, and malware attacks.

Phishing is a cyber attack, and therefore, a security threat that attempts to acquire sensitive or private information from unsuspecting victims (e.g., user names, user passwords, social security numbers, birthdates, credit card numbers, etc.). For example, phishing may involve sending an email intended to deceive a recipient into clicking on a malicious URL that locates, or points to, an illegitimate or counterfeit resource (e.g., a Web site or Web page). The illegitimate or counterfeit resource may be visually similar to an authentic resource. The recipient may then unknowingly provide the sensitive and private information to the illegitimate or counterfeit resource because the recipient incorrectly believes that the illegitimate or counterfeit resource is the authentic resource.

Spamming may involve sending or providing users with unsolicited information via a malicious URL which has been configured to manipulate the relevance or prominence of resources indexed by a search engine. Malware typically involves using a malicious URL to secretly access and infect a computing system without the owner's informed consent or knowledge.

Conventional systems for detecting malicious URLs and limiting cyber attacks and security threats employ various sources to build a blacklist (e.g., human feedback or classification). A blacklist is a list of known malicious URLs. Blacklisting identifies a malicious URL via matching a received URL with a URL on the blacklist, and then blocks the malicious URL when a match occurs. Although blacklisting is an effective means for identifying a known malicious URL, blacklisting cannot detect unknown malicious URLs that are not on the list. Therefore, it is easy for cyber attacks to evade conventional blacklisting systems by continuously modifying and altering the manner in which malicious URLs are configured so they do not result in a blacklist match.

In contrast to blacklisting, some conventional systems use whitelisting to identify known benign web sites by maintaining a list of URLs and/or domains that are known to be threat free. However, whitelisting is not a desirable counter measure to malicious URLs because whitelisting unavoidably blocks benign URLs and/or domains that are not included in the whitelist.

SUMMARY

The techniques described herein use training data to train classification models to detect malicious Uniform Resource Locators (URLs) that target authentic resources (e.g., Web page, Web site, or other network locations accessed via a URL). The techniques train the classification models using one or more machine learning algorithms. The training data may include known benign URLs and known malicious URLs (e.g., training URLs) that are associated with a target authentic resource. The techniques then use the trained classification models to determine whether an unknown URL is a malicious URL. Moreover, after applying the trained classification models to an unknown URL, the techniques may classify the malicious URL as targeting a particular authentic resource.

In various embodiments, the unknown URL may be part of a phishing communication (e.g., email, instant message, text, etc.). The techniques train the classification models using extracted features associated with training URLs and/or apply the classification models using extracted features associated with unknown URLs. For example, the extracted features may include i) lexical features that the classification models use to identify brand name strings in the URL and determine brand name similarity measures such as edit distances (e.g., for a domain and path of the URL), and ii) site/page features that the classification models use to determine site/page information for the resource located by the URL (e.g., a domain age, a domain confidence level, and a rank of the page and/or domain).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, algorithms, components, modules, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

Figure 4:
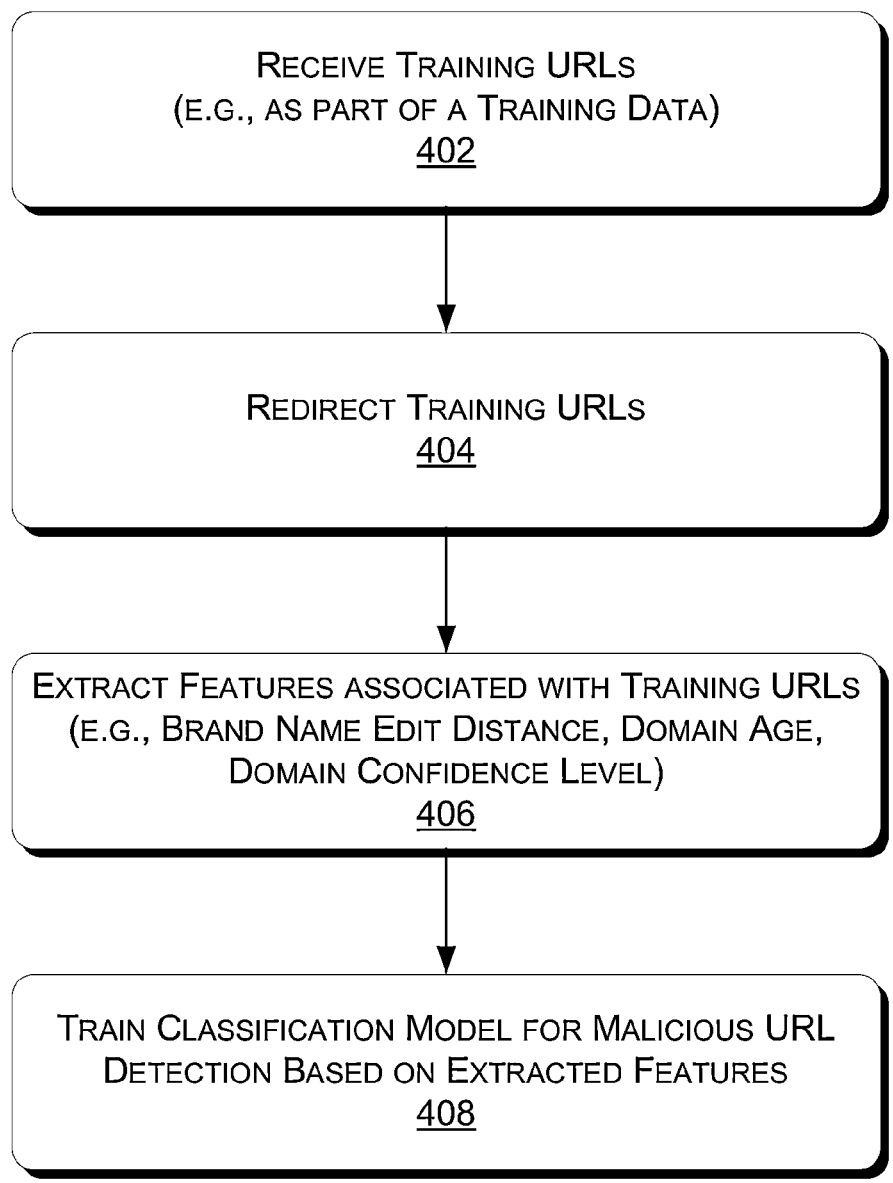

FIG. 4. illustrates an example model training process, in accordance with various embodiments.

Figure 5:
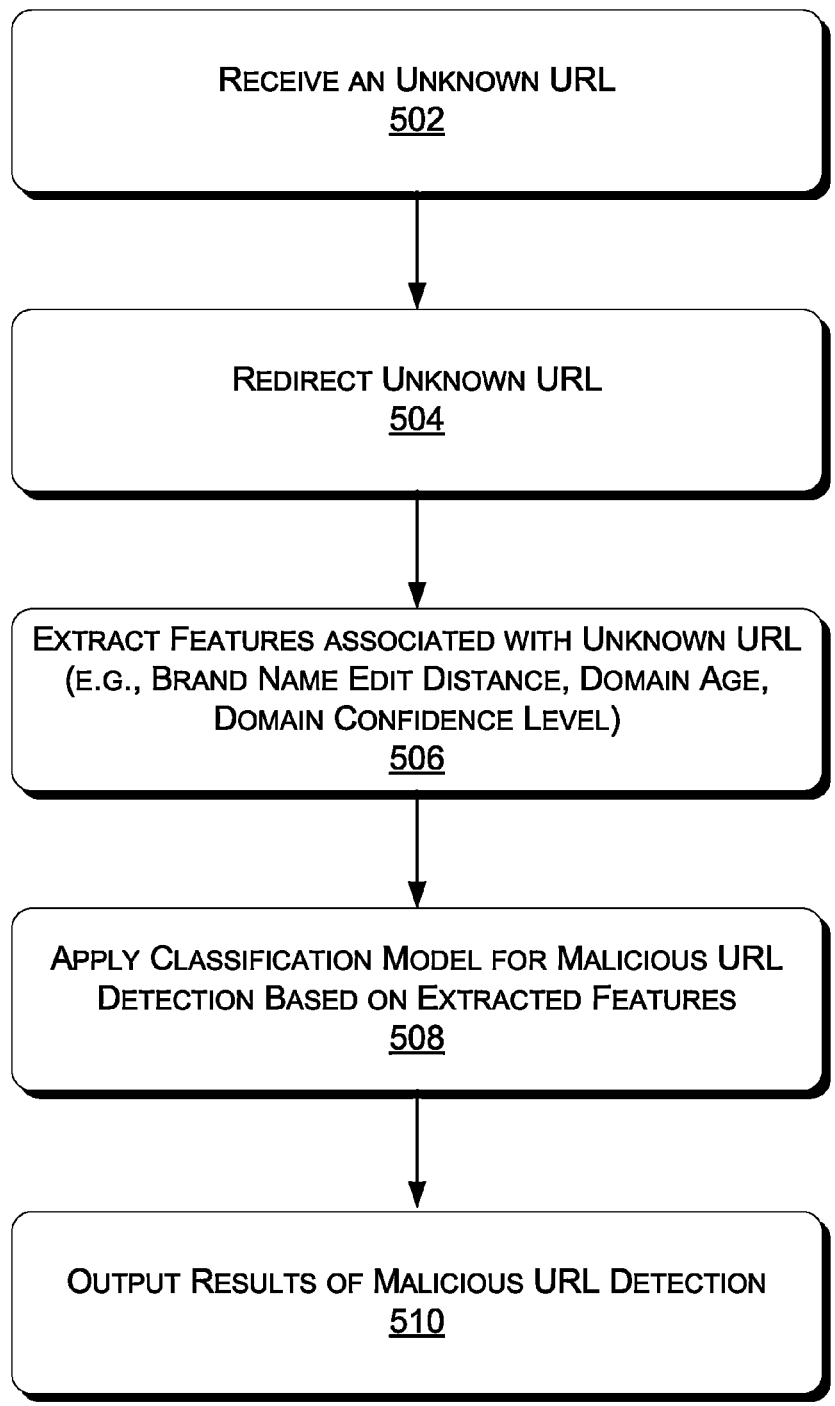

FIG. 5 illustrates an example model application process that, in accordance with various embodiments.

DETAILED DESCRIPTION

Overview

The techniques described herein train classification models to detect malicious Uniform Resource Locators (URLs) that target authentic resources. In various embodiments, the malicious URLs may be unknown URLs that are part of a phishing communication (e.g., email, instant message, text, etc.). In alternative embodiments, the malicious URLs may be unknown URLs that are included in other types of cyber attacks (e.g., spamming, malware, etc.). Or the malicious URLs may be unknown URLs provided to a Web user in a search result or entered by the Web user in a Web browser, for example.

The techniques use training data to train the classification models to determine whether an unknown URL is a malicious URL and then apply the classification models in conjunction with a computing component (e.g., Web browser, email application, search engine, etc.) to protect a user from cyber attacks and security threats.

In various embodiments, the techniques train the classification models to determine whether an unknown URL is a malicious URL based on extracted features associated with the unknown URL. For example, the extracted features may include i) lexical features that the classification models use to identify brand name strings in the URL and determine brand name similarity measures such as edit distances (e.g., for a domain and path of the URL), and ii) site/page features that the classification models use to determine site/page information for the resource located by the URL (e.g., a domain age, a domain confidence level, and a rank of the page and/or domain). As further discussed herein, cyber attacks are becoming more developed and sophisticated, and therefore, they continually alter the lexical makeup of malicious URLs to target attributes (e.g., brand names) of authentic resources. Accordingly, malicious URLs often include a deceptive brand name string that is similar, but not identical, to an authentic brand name string used by an authentic entity in a benign (safe) URL.

As discussed herein, a resource is content or data located on a network that is accessible to one or more network users via a URL. Thus, a resource may be a Web site (e.g., a "domain" root page with a null path) or a Web page that is part of a Web site (e.g., via a defined "path" associated with a "domain"). Moreover, the resource may be associated with and/or configured by an entity. For example, the entity may be a commercial or business entity (e.g., a company) with a network presence that legitimately provides products and/or services over the Internet (e.g., an e-commerce retailer, a payment service, a banking service, an email service, a search engine and so forth). Thus, a legitimate, or authentic, entity may be popular with the general public, and therefore, these entities become a target for cyber attackers who intend to deceive the general public.

As discussed herein, an authentic resource is a network resource that is associated with, or configured by, a well known, legitimate entity that operates without the intent to deceive users or harm users (e.g., a good faith fair practice or service). In contrast, a counterfeit or unauthentic resource is a network resource that is associated with, or configured by, an illegitimate entity that operates with the intent to deceive users and harm users and their computing system (e.g., bad faith phishing attacks, spamming attacks, malware attacks). For example, an illegitimate entity may attempt to steal a user's identity, infect computing systems with viruses, lure users into transferring money into an unintended location, and so forth. Thus, in several instances, an illegitimate entity configures its unauthentic resources to be visually similar to an authentic resource (e.g., visually imitate an authentic resource), so it is easier to deceive and harm a network user. Moreover, the malicious URLs that locate the unauthentic resources may also contain content that may be similar to content associated with a benign URL of an authentic resource or legitimate entity, such as similar brand name strings.

Accordingly, the detection of malicious URLs limits cyber attacks by preventing network users from using (e.g., clicking on) malicious URLs to access unauthentic resources. In at least some embodiments, the techniques may warn network users prior to accessing, or providing sensitive/private information to, an unauthentic resource pointed to by a malicious URL. Thus, malicious URL detection protects computing system hardware/software from computer viruses, prevents execution of malicious or unwanted software, and helps users avoid accessing malicious URLs where they may provide sensitive and/or private information to illegitimate entities that intend to use the information to perform identity theft, for example.

For purposes of this document, the detection of a malicious URL occurs when a computing component (e.g., Web browser, search engine, security modules, system filters, etc.) receives an unknown URL. The computing component may be a client-side component, a server-side component, or a combination thereof, as further discussed herein. An unknown URL is a URL not known by a computing system component to be a malicious URL or a benign URL. For example, an unknown URL may be an unfamiliar new malicious URL, recently made available via the World Wide Web. The examples provided herein may be described with respect to malicious URLs that are associated with a phishing attack. However, it is understood in the context of this document that the classification models may also be trained, using the extracted features, to detect malicious URLs that are associated with a spamming attack and/or a malware attack.

As mentioned above, phishing attacks have recently become more sophisticated because malicious URLs include brand name similar strings. The brand name similar strings may be found in a domain of the malicious URL or a path of the URL. The phishers use the brand name similar strings to lure unsuspecting users to a counterfeit or unauthentic resource that is visually similar to an authentic resource configured by a legitimate entity that has a valid and popular association with a brand name (e.g., a company name, a product name, a team name, a trademark, a marketing slogan, a celebrity name, or the like).

Figure 1:
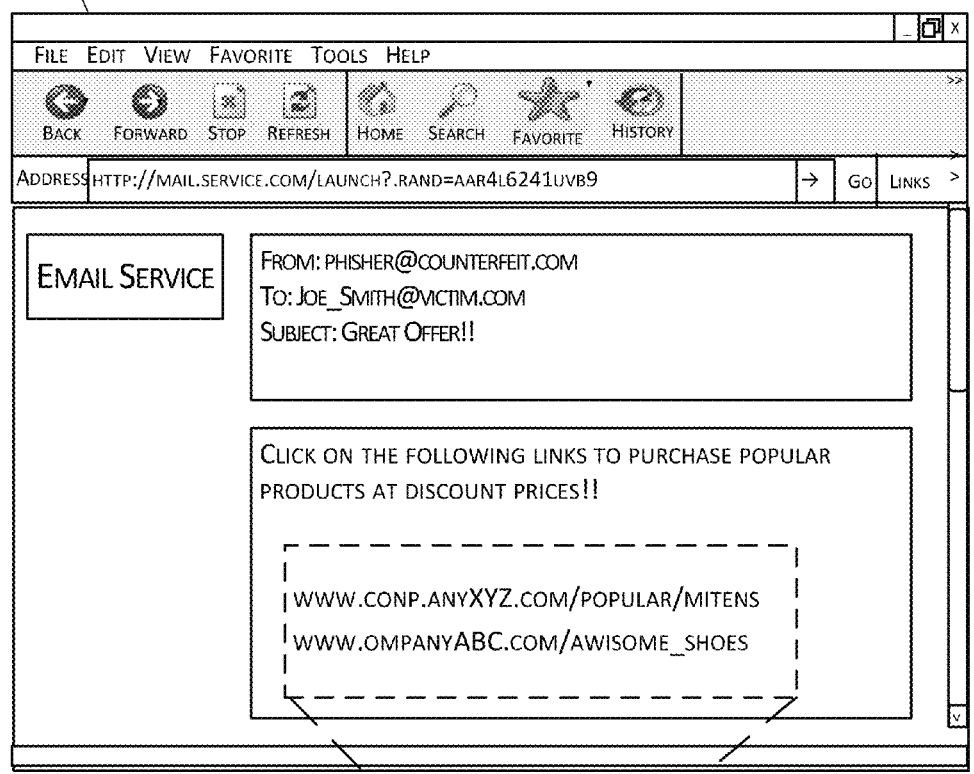
FIG. 1 illustrates an example overview of malicious URL detection for an example communication, in accordance with various embodiments.

FIG. 1 illustrates an example environment 100 where a malicious URL detection module 102 detects that malicious URLs have been received by, or submitted to, a computing component. In this example environment 100, the malicious URLs may be received and displayed via a user interface 104 associated with an email account, and the malicious URL detection module 102 may be a filtering component of an email application located on a client device executing the email application, a server device executing the email application (e.g., cloud computing), or a combination of both.

Accordingly, FIG. 1 illustrates that an example email with a subject line referring to a "Great Offer" is received by the owner of the email account (e.g., Joe_Smith). Moreover, the Great Offer email contains two malicious URLs from an illegitimate entity (e.g., "phisher@counterfeit.com" as illustrated in FIG. 1). The two illustrated URLs that locate unauthentic resources are:

i) www.conp.anyXYZ.com/popular/mitens, and
  ii) www.ompanyABC.com/awisome_shoes.

A URL may comprise a domain (e.g., "www.conp.anyXYZ.com" and "www.ompanyABC.com") and a path separated by '/', (e.g., the path in example (i) is "/popular/mitens" and the path in example (ii) is "awisome_shoes"). For purposes of this document, a token in a URL are those parts of the URL delimited (i.e., separated) by a '.', '/', '?', '=', '-', "_". For instance, the domain tokens in example (i) listed above include 'www', 'conp', 'anyXYZ', and 'com'. The path tokens in example (i) listed above include 'popular' and 'mitens'. The illustrative malicious URLs provided in FIG. 1 are used for example purposes only, and it is understood in the context of this document, that both a domain and a path of a URL may include any number of tokens.

Cyber attacks continue to evolve and become more sophisticated to avoid detection. Specifically, illegitimate entities often configure malicious URLs to include one or more brand name similar strings to lure unsuspecting users to a counterfeit or unauthentic resource that is visually similar to an authentic resource. For instance, the example malicious URL (i) listed above inserts a '.' after the 'p' and before the 'a' of conpanyXYZ. The example malicious URL (i) also replaces the 'm' in 'company' with an 'n' so it reads 'conp.any'. Thus, the example malicious URL (i) introduces a similar string 'conp.anyXYZ' intended to imitate an authentic domain 'companyXYZ' with hopes that unsuspecting users will be deceived and overlook the inserted '.' and the misspelled term 'conpany', and click on the malicious URL believing it belongs to the legitimate 'companyXYZ'.

Thus, illegitimate entities may misspell brand names and/or insert characters (e.g., alphanumeric, ASCII, etc.) so they are not identical but have a similar text string (e.g., omit one or more characters, add one or more characters, switch characters and so forth). Assuming for example, that legitimate companyXYZ has a famous product proprietarily branded as 'mittens', the malicious URL may include one or more tokens directed to a similar string (e.g., "mitens" as seen in FIG. 1, or "awisome_shoes" for authentic "companyABC" in the example malicious URL (ii)).

Accordingly, illegitimate entities are increasingly using brand name similar, but not identical, strings that target authentic brand names associated with legitimate entities, hoping that unsuspecting network users are deceived and will access the unauthentic resource pointed to by the malicious URL, and eventually provide sensitive and private information. Thus, brand names are good descriptors that malicious URL detection can consider when classifying an unknown URL. Moreover, since cyber attackers are continually altering and creating malicious URLs, a domain age and a domain confidence level are also good descriptors for detecting malicious URLs, as further discussed herein.

Illustrative Architecture

Figure 2:
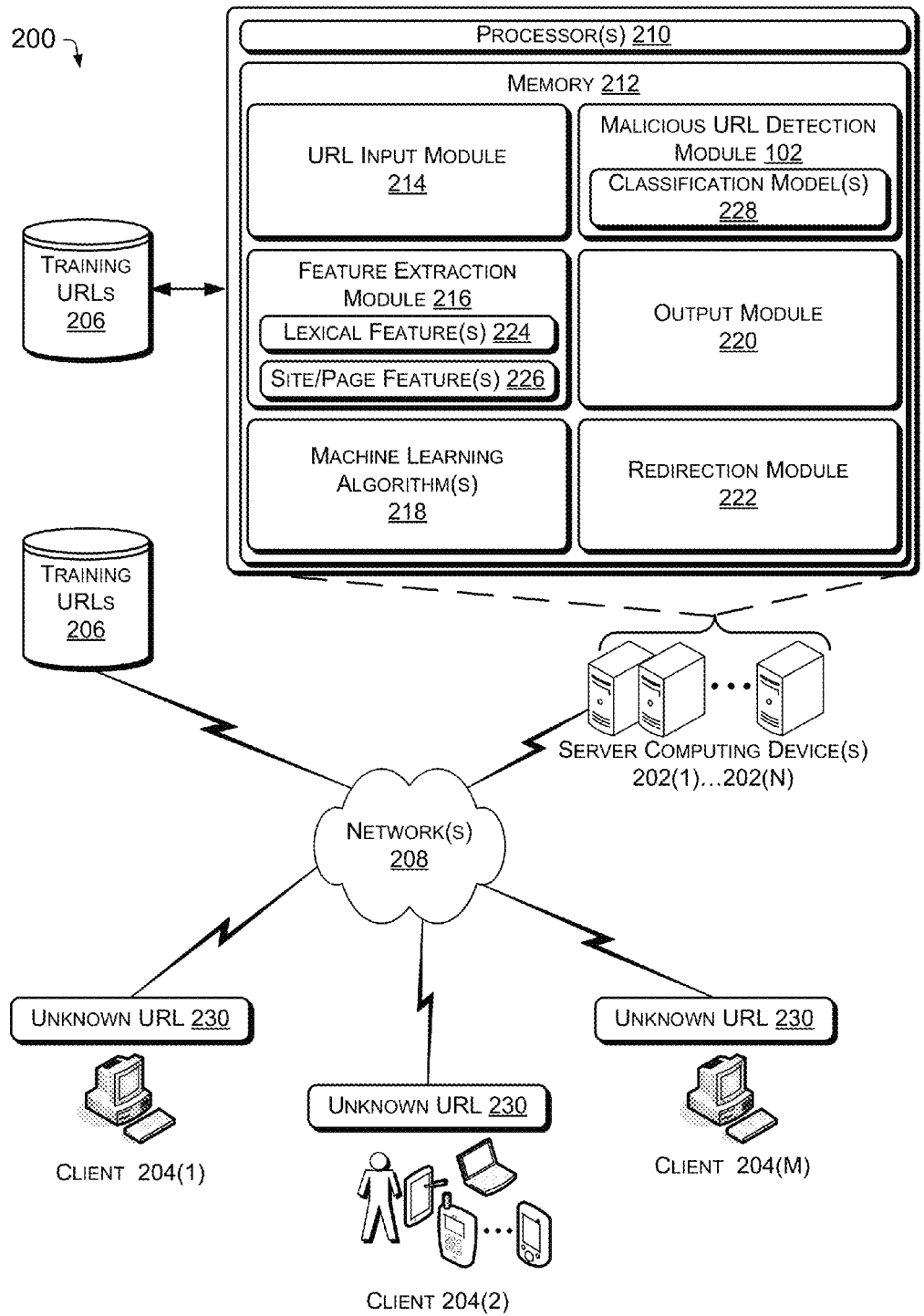
FIG. 2 illustrates an example architecture for implementing the malicious URL detection, in accordance with various embodiments.

FIG. 2 shows an illustrative architecture 200 that may employ the described techniques. To this end, architecture 200 includes one or more server computing devices 202(1) . . . (N), one or more client computing devices 204(1) . . . (M), and training URL sources 206, each coupled to network(s) 208. In various embodiments, the server computing devices 202(1) . . . (N) may host the malicious URL detection module 102, and therefore, the server computing devices 202(1) . . . (N) may be configured in environments where malicious URL detection protects network users (e.g., a population of users that frequently access content at network resources). For example, the server computing devices 202(1) . . . (N) may host Web-based services that provide search functionality and email access, or the server computing devices 202(1) . . . (N) may host the network resources (e.g., Web sites, Web pages, network files, etc.). The client computing devices 204(1) . . . (M) may comprise one of an array of computing devices capable of connecting to one or more network(s) 208, such as a client computer, a personal computer, a laptop computer, a mobile phone, a personal digital assistant (PDA), tablets, gaming consoles, set top boxes, a server computer and the like.

In various embodiments, the architecture 200 can be the World Wide Web, including numerous PCs, servers, and other computing devices spread throughout the world. The server computing devices 202(1) . . . (N) and the client computing devices 204(1) . . . (M), and the training URL sources 206 may be coupled to each other in various combinations through a wired and/or wireless network 208, including a LAN, WAN, or any other networking and/or communication technology known in the art.

In various embodiments, the server computing devices 202 (1) . . . (N) comprise one or more processors 210 and memory 212. The memory 212 may include a URL input module 214, a feature extraction module 216, one or more machine learning algorithms 218, the malicious URL detection module 102, and/or an output module 220, as further discussed herein. In at least one embodiment, the memory 212 may also include a redirection module 222.

While the various computing module(s) and/or algorithm(s) discussed herein are illustrated as being part of the server computing devices 202(1) . . . (N), it is understood that the processor(s) 210, memory 212 and the various computing module(s) and/or algorithm(s) may alternatively be on the client-side as well (e.g., part of the client computing devices 204(1) . . . (M)). Thus, the functionality performed by the module(s) and/or algorithm(s), as discussed herein, may be performed over the network at the server computing devices 202(1) . . . (N), at the client computing devices 204(1) . . . (M), or a combination of both.

The processor(s) 210 may be a single processing unit or a number of units, all of which could include multiple computing units. The processor(s) 210 may be implemented as one or more microprocessors, microcomputers, microcontrollers, digital signal processors, central processing units, state machines, logic circuitries, system on chip (SoC), and/or any other devices that manipulate signals based on operational instructions. Among other capabilities, the processors 210 may be configured to fetch and execute computer-readable instructions stored in the memory 212.

The memory 212 may comprise computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave. As defined herein, computer storage media does not include communication media.

It is understood in the context of this document, that the functionality performed by the URL input module 214, the feature extraction module 216, the machine learning algorithms 218, the malicious URL detection module 102, the output module 220 and/or the redirection module 222 may be all inclusive on a single computing device (e.g., a server computing device or a client computing device) implementing malicious URL detection and classification, or spread amongst a plurality of different computing devices connected to one another via network(s) 208 (e.g., multiple server computing devices and/or client computing devices).

In various embodiments, the URL input module 214 collects training URLs (e.g., known benign URLs and known malicious URLs) from the training URL sources 206. In some embodiments, the training URL sources 206 may include, for example, Internet sources such as search engines or databases that have access to and knowledge of a large number of known benign URLs and malicious URLs (e.g., thousands of benign URLs and thousands of malicious URLs that have already been classified). Accordingly, each training URL is labeled as a known malicious URL or a known benign URL for training purposes. In various embodiments, the label may also include a reference to the type of malicious attack of the URL and/or a reference to which legitimate entity or which authentic resource (e.g., Web site or Web page) a known malicious URL targets (e.g., an indication that a URL "is a malicious URL that targets companyXYZ"). Thus, the training URLs may be separated and filtered according to associations between the malicious URLs and an authentic resource or authentic entity, as well as the known benign URLs that are associated with the same authentic resource or authentic entity.

Once the URL input module 214 collects the training URLs from the training URL sources 206, the URL input module 214 provides the training URLs to the feature extraction module 216. The feature extraction module 216 may then extract features associated with each training URL, as further discussed herein. In various embodiments, the extracted features are selective lexical features 224 of the training URLs. In some embodiments, the extracted features are selective site/page features 226 of the training URLs.

Provided the labels (e.g., benign and/or malicious as well as the type of attack for a malicious label and an association with an authentic entity or resource), the techniques use one or more machine algorithms(s) 218 to train, or build, classification models 228. For example, using the labels, the techniques may train a classification model 228 for multiple different popular legitimate entities and/or authentic resources that are commonly targeted by cyber attacks (e.g., phishers). In some embodiments, the classification model 228 is trained for a particular user who is interested in protecting only a selected set of legitimate entities and/or authentic resources where a user provides sensitive or private information. In at least one embodiment, the training URLs may be determined in association with a list of selected legitimate entities and/or authentic resources that are often targeted by cyber attacks. Accordingly, the techniques discussed herein can train the one or more classification models 228 specifically for the selected legitimate entities and/or authentic resources.

In various embodiments, the machine learning algorithms 218 may be Support Vector Machine (SVM) used to train the classification models 228 (e.g., develop decision criteria for classifying whether an unknown URL is malicious, and if so, what legitimate entity or authentic resource it targets). In at least one embodiment, SVM is a classification technique that is based on a Structural Risk Minimization theory, and therefore, SVM finds the largest distance to the nearest training data points of any class, called functional margin. Moreover, SVM may comprise a kernel function that maps an input vector associated with extracted features into a high dimension hyperspace so that similarities between samples can be determined. Example kernel functions used in SVM include, but are not limited to, radial basis function (RBF), Linear, Polynomia, Sigmoid and so forth. SVM also includes cross-validation that tunes parameters of the classification models 228 to improve prediction accuracy for classifying an unknown URL as a malicious URL that targets a legitimate entity or an authentic resource.

Accordingly, in various embodiments, the machine learning algorithm(s) 218 (e.g., SVM) are configured to accept information associated with, and/or determined from, selective extracted features, and use the information to construct or update the classification model(s) 228 (e.g., adapt decision criteria).

In various embodiments, the feature extraction module 216 may extract lexical features 224 and site/page features 226 from training URLs 206 to first train classification models 228 using machine learning algorithm(s) 218. Then the malicious URL detection module 102 may use the classification models 228 on lexical features 224 and site/page features 226 that the feature extraction module 216 extracts from an unknown URL 230 (e.g., received at a client computing device, submitted to a client computing device, and/or about to be provided to the server computing device by a client computing device, etc.). Thus, the malicious URL detection module 102 is configured to determine if the unknown URL 230 is a malicious URL that targets an authentic resource or a legitimate entity.

In various embodiments, lexical features 224 extracted by the features extraction module include 216 include a brand name edit distance (e.g., for the whole URL, for the domain of the URL, or for the path of the URL). As discussed above, cyber attackers often include "deceptive" brand name strings in malicious URLs that are similar, but not identical to, "real" brand name strings associated with an authentic entity or a benign URL (e.g., "conp.anyXYZ" is similar to "companyXYZ", "mitens" is similar to "mittens", "ompanyABC" is similar to "companyABC", and "awisome_shoes" is similar to "awesome_shoes", as illustrated in FIG. 1). Therefore, detection and analysis of a deceptive brand name string aids in malicious URL detection. In particular, determining an edit distance between a deceptive brand name string and a real brand name string.

Malicious URL detection is aided by determining a degree of difference between a deceptive brand name string and a real brand name string. One of the lexical features 224 extracted by the feature extraction module 216 is brand name edit distance. An edit distance is a minimum number of corrections performed at the character level to bring a string or substring of text (e.g., deceiving text used in a malicious URL) into exact alignment with a real brand name used by an authentic entity or an authentic resource that is the target of the malicious URL.

For example, B={$b_1, b_2, \ldots, b_n$} is a set of brand names known to be authentic and associated with resources (e.g., web site, group of web pages, etc.) configured by a legitimate entity. In various embodiments, the set of known brand names B may be identified and included in the training data used in the training of the classification models 228. Each $b_i$ in B denotes a real brand name used by the legitimate entity (e.g., a company name, a product name, a team name, a trademark, a marketing slogan, a celebrity name, or the like). Also, let S be a string of text (e.g., a URL or a portion of a URL) whose brand name edit distance is to be measured. Thus, S={$s_1, s_2, \ldots, s_m$} is a set of substrings (e.g., one or more tokens and delimiters in the URL) derived from S, where each $s_i$ is an individual substring of S. The brand name edit distance between S and an individual brand name $b_i$ may be defined as a minimum edit distance between the set of substrings of S and $b_i$, as follows in equation (1):

$$\text{brand\_dist}(S, b_i) = \min\{\text{edit\_dist}(s_j, b_i) | s_j \in S\} \quad \text{Equ. (1)}$$

The brand name distance between S and the complete set of brand names B associated with the legitimate entity may be defined as the minimum brand name distance between S and the complete set of brand names B, as follows in equation (2):

$$\text{brand\_dist}(S, B) = \min\{\text{brand\_dist}(S, b_i) | b_i \in B\} \quad \text{Equ. (2)}$$

In various embodiments, the edit distance calculations in equations (1) and (2) may not be used for a URL known to be benign (e.g., a URL that is part of a set of URLs of the legitimate entities or authentic resources). Or the edit distance may not be calculated for a URL in a white list of URLs which are known to be benign. This would avoid a situation where a URL of a legitimate entity or authentic resource would have an edit distance of zero, which might be confused with a malicious URL which contains a brand name in B at a position other than a second level domain (SLD) whereas the URL of a legitimate entity or authentic resource would have the brand name in its SLD.

Thus, equations (1) and (2) provided above are able to determine the brand name edit distance between one or more substrings in a potential malicious URL and a complete set of brand names associated with one or more legitimate entities or an authentic resources (e.g., popular resources or companies that are often targeted by cyber attacks).

In various embodiments, the brand name edit distance can be calculated separately, based on the discussion and equations above, for the domain of the URL and the path of URL. Thus, extracted features may include a path brand name distance (e.g., minimum edit distance) and a domain path name distance (e.g., minimum edit distance).

Using the example malicious URLs provided above with respect to FIG. 1, "conp.anyXYZ" in example (i) has a domain brand name edit distance of two because one would have to remove the '.' between the 'p' and the 'a' and change the first 'n' to an 'm' to arrive at "companyXYZ", which may be a real authentic Web site used by CompanyXYZ. Similarly, the path brand name edit distance for example (i) is one because one would have to add a 't' to 'mitens' to arrive at 'mittens', which may be an authentic and proprietary product of CompanyXYZ.

The brand name edit distances (e.g., minimum edit distances for the domain and path) are useful when attempting to detect malicious URLs because, as explained above with respect to FIG. 1, malicious URLs often contain similar brand name substrings with multiple errors and alterations at the character level intended to deceive an unsuspecting user. In other cases, malicious URLs may often have a brand name at a position different from the legitimate URL to deceive an unsuspecting user. Thus, for an unknown URL not on the white list, the lower the determined brand name edit distance is, the more likely the URL is a malicious URL.

Malicious URLs also have other lexical features that are distinguishably different from benign URLs. Thus, an analysis of other lexical features of a URL may help determine whether a URL is a malicious URL or a benign URL. For example, the feature extraction module 216 may extract other lexical features (e.g., in a model training process and/or a model application process) such as a domain token count, an average domain token length, a longest domain token, a path token count, an average path token length, a longest path token, and other lexical features.

In various embodiments, site/page features 226 extracted by the feature extraction module include 216 include a domain age and/or a domain confidence level. As previously mentioned, cyber attackers are constantly creating and altering malicious URLs. Accordingly, compared to benign URLs with authentic domains, malicious URLs often have a domain that has been in existence for a shorter period of time. Therefore, a domain age feature can be an effective feature to help detect malicious URLs. In some embodiments, the feature extraction module 216 may access a network domain registry or other domain information source with domain registration information (e.g., date, length of time registered, etc.) to determine the domain age of a URL.

The domain confidence level is directed towards determining a reliability indicator for a domain of a URL. Phishing attacks tend to use a same set of domains or second level domains for the malicious URLs. In order to determine a domain confidence level for a URL, the feature extraction module 216 maintains a list of known benign URLs and a list of known malicious URLs (e.g., phishing URLs). The URLs on these two lists may be part of the training URLs discussed above, or may be additional URLs known to be benign or malicious. In order to determine the domain confidence level, the feature extraction module 216 may define a domain of URL as d, and the second level domain may be referred to as SLD(d). A SLD is a domain token that is directly below a top-level domain (TLD). The TLD is the domain token at the highest level in the hierarchical Domain Name System (DNS) of the Internet. In the example URL (ii) listed above with respect to FIG. 1, the TLD is 'com'. Thus, the SLD in the exemplary URL is 'ompanyABC'.

Moving on, once the SLD(d) of the URL being examined is determined, the feature extraction module 216 determines a number x of benign URLs on the list of known benign URLs that are hosted by the SLD(d). Similarly, the features extraction module 216 determines a number y of malicious URLs on the list of known malicious URLs that are hosted by the SLD(d). The feature extraction module 216 then defines the domain confidence level of d as a ratio of benign URLs hosted by the SLD(d) over malicious URLs hosted by the same SLD(d). For example, the feature extraction module 216 may define the domain confidence level of d, as follows in equation (3):

$$\text{domain\_conf\_level}(d) = [(x+A)/(x+y+2A) - 0.5] \times 0.6 + 0.5 \quad \text{Equ. (3)}$$

Experiments that determine domain confidence level shows that domain confidence levels often fall within the range [0.2, 0.8]. In this way, the domain confidence level of 1.0 is reserved for the domains in a white list, and domain confidence level of 0.0 is reserved for the domains in a black list. The larger the value is (e.g., closer to one), the more reliable the SLD, and therefore, the domain of the URL becomes, thereby indicating a stronger likelihood that the URL is a benign URL and not a malicious URL. In equation (3), A is a constant that the feature extraction module 216 may set to avoid oversensitivity (e.g., when there is not sufficient data in the lists, the domain confidence level will be closer to 0.5 which means unknown reliability since it is directly in the middle of zero and one).

In various embodiments, the feature extraction module 216 may also extract other site/page related features (e.g., in the model training process or in the model application process) including link popularity features that determine a number of incoming links for a URL being examined and/or ranking features for a URL being examined. Incoming links are links on other Web pages that direct a Web user and a Web browser to the target URL being examined. The ranking features are ranking values by one or multiple search engines or other tools for the whole URL, the domain of the URL, and/or the SLD of the URL. Malicious URLs tend to have a low number of incoming links or a low ranking value by a search engine, and thus a low value of link popularity or a low ranking, while benign URLs tend to have a high number of incoming links or a high ranking, and thus a high value of link popularity. The feature extraction module 216 may obtain information associated with link popularity from known search engines, such as the Microsoft® Bing® search engine. Different search engines may produce different information on link popularities due to different coverage of web pages which the individual search engines crawl. Accordingly, the link popularity feature extraction module 406 may access and obtain information about link popularity from an arbitrary set (e.g., five) of different search engines in the industry, for example. Moreover, in various embodiments, link popularity features may be determined for the whole URL, the domain of the URL, and/or the SLD of the URL.

In various embodiments, the output module 220 outputs results after the malicious URL detection module 102 applies the classifications models 228 to an unknown URL 230. For example, the results may notify a Web user at one of client computing devices 204(1) . . . (M) that a URL in a communication is likely to be a malicious URL. Moreover, the notification may indicate that the likely malicious URL targets a particular authentic resource and/or legitimate entity. In another example, the results may be associated with a client-side filter or server-side filter which prevents a communication containing the likely malicious URL or search results containing the likely malicious URL from being displayed or presented to the Web user.

In various embodiments, the redirection module 222 may convert training URLs used in the model training process and/or unknown URLs used in the model application process into their "true" URLs. Since cyber attacks often use redirected URLs to lure users, the redirection module 222 is used to locate and identify the true URLs after the redirection, and thus, the feature extraction module 216 can then extract the features discussed above from the true URLs after the conversion of the redirected URLs by the redirection module 222.

Figure 3:
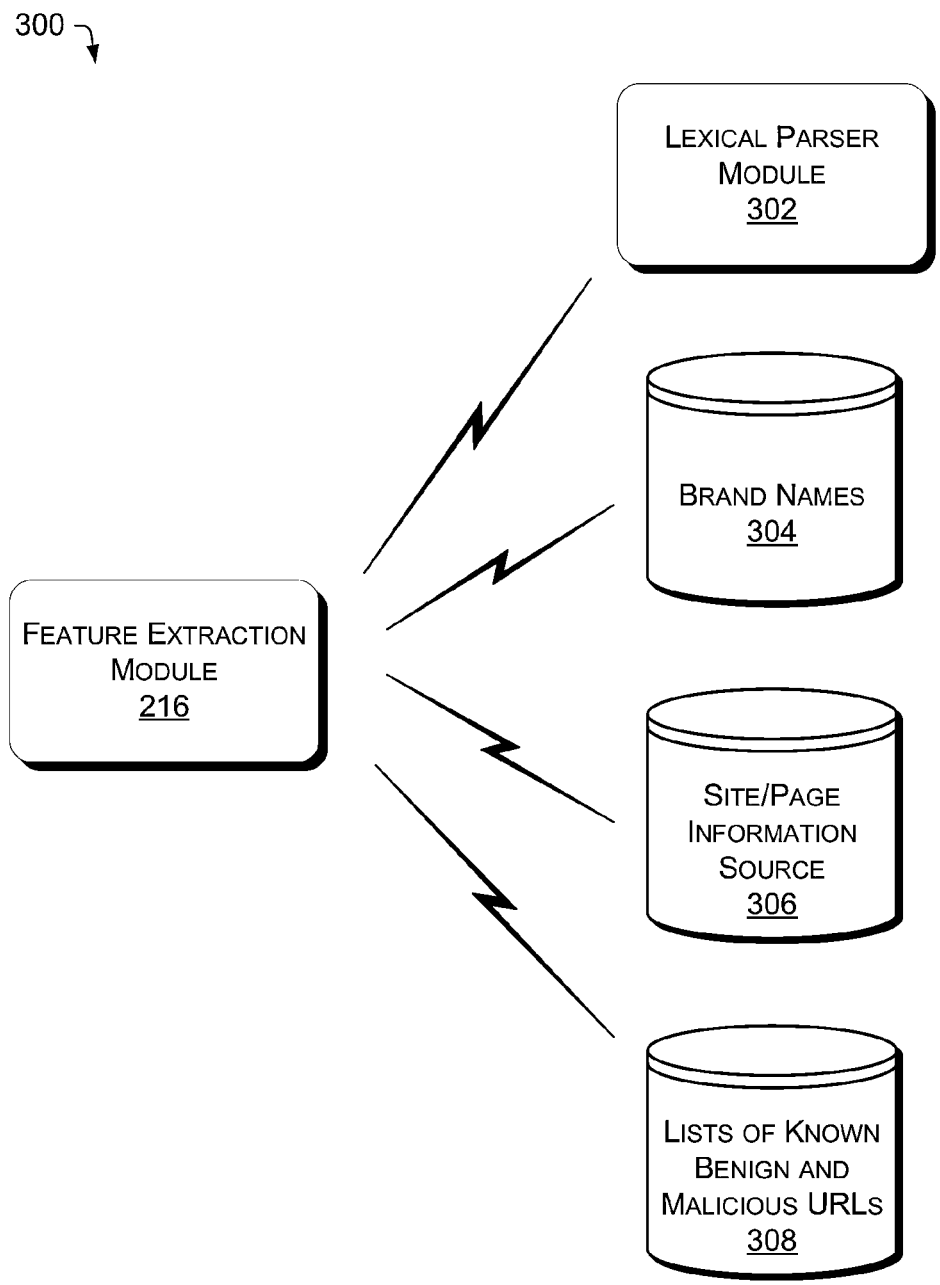
FIG. 3 illustrates example interactions used to detect malicious URLs, in accordance with various embodiments.

FIG. 3 illustrates an example environment 300 where the feature extraction module 216 interacts with additional components and/or information databases or sources. As discussed above, the feature extraction module 216 extracts lexical features 224 from a URL. Accordingly, in various embodiments, the feature extraction module 216 may employ a lexical parser module 302 when determining substrings in the URL and comparing lexical features. Moreover, the feature extraction module 216 and may access known brand names 304 of popular legitimate entities targeted by phishing attacks, as discussed above, when performing a comparison to determine a brand name similarity measure such as an edit distance. Additionally, as discussed above, the feature extraction module 216 may access one or more site/page information sources 306 to determine a domain age, a link popularity, and/or a rank as well as the two lists of known benign URLs and known malicious URLs 308 (e.g., to determine a confidence level). In various embodiments, the described interactions or exchange of data/requests described above with respect to FIG. 3 may be performed locally at a serving computing device or a client computing device. In alternative embodiments, the interactions or exchange of data/requests may be performed across multiple devices over network(s) 208.

Illustrative Processes

Example operations are described herein with reference to FIG. 4 and FIG. 5. The processes are illustrated as logical flow graphs, which represent a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Moreover, the example operations in FIG. 4 and FIG. 5 may be described with reference to the features and/or elements illustrated in FIGS. 1-3.

FIG. 4 illustrates an example model training process 400 that trains the classification models 228 used by the malicious URL detection module 102. At 402, the URL input module 215 accesses and receives training URLs from training URL sources 206. The training URLs include known (e.g., labeled) benign URLs and known malicious URLs. The known malicious URLs may be labeled with the attack type, and malicious URLs may be grouped according to the attack type to train one or more classification models for each attack type. Furthermore, the known malicious URLs may further be labeled as targeting a particular authentic resource or a legitimate company.

In at least one embodiment, at 404, the redirection module 222 redirects the training URLs to their true URLs so that feature extraction can be performed on the true URLs.

At 406, the feature extraction module 216 extracts features associated with each training URL (or a redirected URL). In various embodiments, the feature extraction module 216 may extract one or more lexical features 224 as discussed above (e.g., a domain brand name edit distance and/or a path brand name edit distance). In various embodiments, the feature extraction module 216 may also extract one or more site/page features 226 as discussed above (e.g., a domain age and/or a domain confidence level). As part of the training URL feature extraction, the feature extraction module 216 may employ, communicate and/or interact with the lexical parser module 302, the brand names 304, the site/page information sources 306, and/or the lists of known benign and malicious URLs 308.

At 408, the machine learning algorithms 218 use the features extracted by the feature extraction module 216, as well as the labels for the training URLs, to train the classification models 228 for the malicious URL detection module 102. Accordingly, during training, the machine learning algorithms 218 may build new classification models 228 or continually adapt decision criteria of existing classification models 228, based on the training URLs.

In various embodiments, the example training process 400 may be repeated for each training URL, or a group of training URLs, as training URLs become available (e.g., over time, if a new legitimate entity becomes a popular target for attacks, etc.) for obtaining better-performing classification models or adapting existing models for changing attack patterns. The training URLs may be a selected subset from a set of labeled URLs. For example, the classification models may be retrained or adapted using a set of training URLs selected rather than URLs that were previously wrongly classified. Thus, the system may continually seek to improve the decision criteria used in the classification models 228 so that the malicious URL detection module can continue to protect network users, as well as, authentic resources and/or legitimate entities.

FIG. 5 illustrates an example model application process 500. At 502, the URL input module 214 receives an unknown URL 230. For example, the URL input module 214 may be part of a server-side component that receives an unknown URL 230 as part of search results provided by a search engine. In another example, the URL input module 214 may be part of a client-side component that receives the unknown URL 230 via a Web user action, such as data entry (e.g., text entry) into a Web browsing entry window, an embedded link selection via a mouse click, and so forth.

In various embodiments, at 504, the redirection module 222 redirects the unknown URL 230 to its true URL so that feature extraction can be performed on the true URL.

At 506, the feature extraction module 216 extracts features associated with the unknown URL 230 (or a redirected URL). In various embodiments, the feature extraction module 216 may extract one or more lexical features 224 as discussed above (e.g., a domain brand name edit distance and/or a path brand name edit distance). In various embodiments, the feature extraction module 216 may also extract one or more site/page features 226 as discussed above (e.g., a domain age and/or a domain confidence level).

At 508, the malicious URL detection module 102 applies the classification models 228 and the decision criteria therein to the features extracted from the unknown URL 230. The application of the classification models 228 determines whether the unknown URL 230 is likely to be a malicious URL or a benign URL. Moreover, the application of the classification models 228 may also determine an authentic resource and/or a legitimate entity that is targeted by the unknown URL 230 when the unknown URL is determined to be a malicious URL. Moreover, as part of the unknown URL 230 feature extraction and detection, the feature extraction module 216 and/or the malicious URL detection module 102 may again employ, communicate and/or interact with the lexical parser module 302, the brand names 304, the site/page information sources 306, and/or the lists of known benign and malicious URLs 308.

At block 510, the output module 220 provides results of the malicious URL detection. For example, the output module 220 may indicate, that the unknown URL 230 is a malicious URL that targets example CompanyXYZ. In some embodiments, the output module 210 may also provide a confidence level associated with the indication if the unknown URL 230 is malicious or benign. This indication may be provided to a Web user, a device executing a Web browser, or the targeted resource and/or entity. In various embodiments, the indication may be in the form of a warning that then allows the Web user to proceed to access the unauthentic resource located by the malicious URL if the Web user wishes. Or, the output module 220 may indicate that the web user is prevented from visiting the malicious URL altogether. Alternatively, if the unknown URL 230 is a benign URL, the output module 220 may provide an indication that the unknown URL 230 has been checked, and the Web user can proceed to access the authentic resource.

The example model application process 500 may be repeated for multiple different unknown URLs 230. In various embodiments, the machine learning algorithms 218 may continue to adapt and update the classification models 228 using extracted features learned from new labeled URLs and/or the unknown URLs 230 once they are verified (e.g., human verification) to be malicious or benign. The unknown URLs 230 may be used to train the model after they are verified in order to avoid disturbing the classification models if erroneous detection occurs. By adapting and considering data associated with new features for one or multiple new labeled URL and/or one or more unknown URLs 230 after they are verified, the classification models 228 are able to provide better protection against malicious URLs even when cyber attackers are continuously trying to evade detection by modifying the manner in which malicious URLs are configured.

It is understood in the context of this document, that any combination of discriminative features may be extracted and used in the model training process and/or the model application process (e.g., domain brand name edit distance, path brand name edit distance, domain age, domain confidence level, domain token count, average domain token length, longest domain token, path token count, average path token length, longest path token, link popularity features, etc.).

CONCLUSION

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A method comprising:
receiving a uniform resource locator (URL) that includes one or more substrings, wherein each substring comprises a plurality of alphanumeric characters;
extracting, via one or more processors, a plurality of features associated with the URL, wherein at least one first feature of the plurality of features is a domain confidence level that determines a reliability of a domain or a second level domain of the URL, wherein the reliability is based on a ratio of a number of known benign URLs hosted by the domain or the second level domain of the URL compared to a number of known malicious URLs hosted by the domain or the second level domain;
determining, as at least one second feature of the plurality of features, a similarity measure between a whole or part of the URL and a brand name associated with an authentic resource or a legitimate entity; and
applying one or more classification models to the at least one first feature and the at least one second feature to determine whether a resource located by the URL is an unauthentic resource.

2. The method as recited in claim 1, wherein the similarity measure comprises a minimum of edit distances between substrings of the whole or the part of the URL and the brand name if the URL is not on a white list.

3. The method as recited in claim 1, further comprising classifying the URL as a malicious URL that targets the brand name in response to the one or more classification models determining that the resource located by the URL is the unauthentic resource.

4. The method as recited in claim 1, wherein the brand name comprises at least one of a company name, a product name, a team name, a trademark, a marketing slogan, a celebrity name, or a second level domain that is commonly used by the authentic resource or the legitimate entity.

5. The method as recited in claim 1, wherein at least one third feature of the plurality of features is a domain age that determines how long a domain of the URL has been in existence.

6. The method as recited in claim 1, further comprising:
receiving a plurality of training URLs known to be malicious URLs or benign URLs; and
learning the one or more classification models using one or more machine learning algorithms based on features extracted from the plurality of training URLs.

7. The method as recited in claim 1, wherein the reliability is based on the ratio of the number of known benign URLs hosted by the second level domain of the URL compared to the number of known malicious URLs hosted by the second level domain.

8. The method as recited in claim 1, wherein at least one third feature of the plurality of features is a link popularity of the URL.

9. One or more computer storage media comprising instructions that, when executed by a processor, perform operations comprising:
- receiving a uniform resource locator (URL) that includes a plurality of tokens, wherein each token comprises one or more characters;
- determining a similarity measure between a whole or part of the URL and a brand name;
- determining a domain confidence level for the URL, the domain confidence level indicating a reliability of a domain or a second level domain of the URL based on a ratio of a number of known benign URLs hosted by the domain or the second level domain of the URL compared to a number of known malicious URLs hosted by the domain or the second level domain;
- applying classification criteria to the similarity measure and the domain confidence level to determine whether a resource located by the URL is a counterfeit resource; and
- classifying the URL as a malicious URL if the resource located by the URL is the counterfeit resource.

10. The one or more computer storage media as recited in claim 9, wherein the malicious URL is included as part of a phishing cyber attack.

11. The one or more computer storage media as recited in claim 9, wherein the similarity measure comprises a minimum of edit distances of substrings of the whole or part of the URL and the brand name if the URL is not on a white list.

12. The one or more computer storage media as recited in claim 9, wherein the brand name comprises at least one of a company name, a product name, a team name, a trademark, a marketing slogan, a celebrity name, or a second level domain that is commonly used by an authentic resource or a legitimate entity.

13. The one or more computer storage media as recited in claim 9, wherein the operations further comprise:
- determining a domain age of the URL, the domain age indicating how long the URL has been in existence; and
- applying the classification criteria to the domain age to determine that the resource located by the URL is the counterfeit resource.

14. The one or more computer storage media as recited in claim 9, wherein the operations further comprise:
- receiving a plurality of training URLs known to be malicious URLs or benign URLs; and
- learning the classification criteria using one or more machine learning algorithms based on features extracted from the plurality of training URLs.

15. The one or more computer storage media as recited in claim 9, wherein the operations further comprise classifying the URL as the malicious URL that targets the brand name.

16. A system comprising:
- one or more processors;
- one or more memories;
- a uniform resource locator (URL) input module, stored on the one or more memories and executable by the one or more processors, to receive a URL;
- a feature extraction module, stored on the one or more memories and executable by the one or more processors, to:
  - determine a similarity measure between a whole or a part of the URL and a brand name; and
  - determine a domain confidence level for the URL, the domain confidence level indicating a reliability of at least one of a domain or a second level domain of the URL based on a ratio of a number of known benign URLs hosted by the at least one of the domain or the second level domain of the URL compared to a number of known malicious URLs hosted by the at least one of the domain or the second level domain; and
- a malicious URL detection module, stored on the one or more memories and when executable by the one or more processors, to apply classification models to the similarity measure and the domain confidence level to classify the URL as a malicious URL or a non-malicious URL.

17. The system as recited in claim 16, further comprising one or more machine learning algorithms, stored on the one or more memories and executable by the one or more processors, to train the classification models based on features extracted from a plurality of training URLs.

18. The system as recited in claim 16, wherein the similarity measure comprises a minimum of edit distances between substrings of the whole or the part of the URL and a text string associated with the brand name.

19. The system as recited in claim 16, wherein the malicious URL detection module is part of an email filter component, a search engine component, or a Web browser component.

20. The system as recited in claim 16, wherein the feature extraction module is further executable by the one or more processors to determine a domain age of the URL and the malicious URL detection module is further executable by the one or more processors to apply the classification models to the domain age to classify the URL as the malicious URL or the non-malicious URL, wherein the domain age indicates an amount of time the URL has been in existence.

* * * * *